E. CHAMBERLIN.

Devices for Clamping Whip-Sockets to Vehicles.

No. 5,700. Reissued Dec. 23, 1873.

WITNESSES.

P. C. Dietrich

C. H. Watson.

INVENTOR.

Edwin Chamberlin.

per J. H. Alexander & Co

ATTORNEYS.

AM. PHOTO-LITHOGRAPHIC Co. N.Y. (OSBORNE'S PROCESS.)

UNITED STATES PATENT OFFICE.

EDWIN CHAMBERLIN, OF LANSINGBURG, ASSIGNOR, BY MESNE ASSIGNMENTS, TO HIMSELF AND JOHN O. MERRIAM, OF TROY, NEW YORK.

IMPROVEMENT IN DEVICES FOR CLAMPING WHIP-SOCKETS TO VEHICLES.

Specification forming part of Letters Patent No. 43,896, dated August 23, 1864; reissue No. 2,387, dated November 6, 1866; reissue No. 4,787, dated March 5, 1872; reissue No. 5,700, dated December 23, 1873; application filed October 15, 1873.

DIVISION C.

*To all whom it may concern:*

Be it known that I, EDWIN CHAMBERLIN, of Lansingburg, county of Rensselaer and State of New York, have invented certain new and useful Improvements in Whip-Sockets; and they relate to the fastening device, and consist in forming the device in one piece of metal, one part being a spring which embraces the socket, and the ends thereof forming jaws to clasp the dash-rail, and having perforations between the two parts to receive a bolt, by which, in connection with a thumb-nut, the parts are drawn together with any degree of pressure required; and I do hereby declare that the following is a full, clear, and exact description thereof, which will enable others skilled in the art to which it appertains to make and use the same, reference being had to the accompanying drawing, with letters of reference marked thereon, forming a part of this specification, in which—

Figure 1:
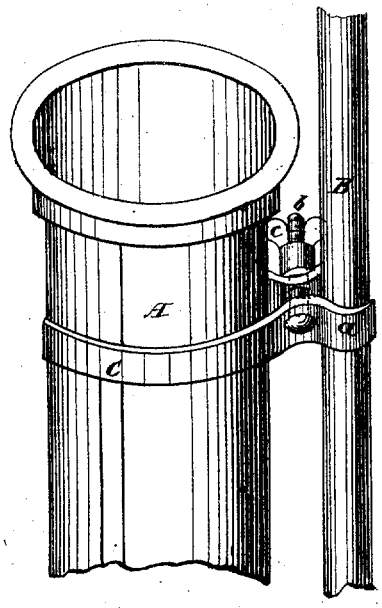
Figure 2:
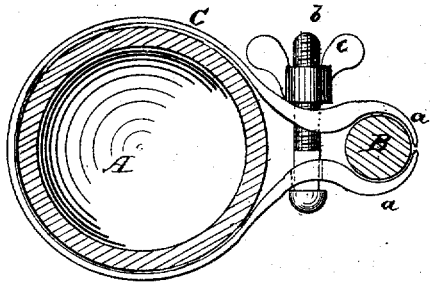

Figure 1 represents a side elevation of a socket and dash-rail representing my invention attached; and Fig. 2 represents a longitudinal section of the same.

A represents a socket, and B the dash-rail or other part of the vehicle to which the socket may be attached, all of which are of any convenient or desirable construction. C represents a band encircling the socket A, the ends of which terminate in jaws *a a*, which clasp the dash-rail B. That part embracing the socket is a spring, in order that the size of the same may be made to accommodate sockets of different sizes. Just back of the jaws *a a* the parts are perforated to receive a bolt, *b*, which is furnished with a nut, *c*, by which the parts between the dash-rail and socket are drawn toward each other.

The advantage in this construction is both in simplicity and utility. The parts encircling both the socket and dash-rail being in a single piece, and as a space is left between the parts where the bolt passes through, its capacity for receiving sockets is greater than where shoulders or faces are formed to come together, and that part embracing the socket being a spring, it fits a large or small socket equally well, the whole device forming a fastener simple in construction, convenient and efficient in operation, durable in use, and not liable to break.

Having thus fully described my invention, what I claim, and desire to secure by Letters Patent, is—

The fastening device consisting of the elastic band C, having jaws *a a*, bolt and nut *b c*, in combination with the socket A, as and for the purpose specified.

In testimony whereof I hereunto set my hand in presence of two witnesses.

EDWIN CHAMBERLIN.

Witnesses:

C. H. WATSON,

ANSON SEARLS.